United States Patent
Kovalchuk et al.

(10) Patent No.: US 10,961,812 B2
(45) Date of Patent: Mar. 30, 2021

(54) DISINTEGRATABLE BISMALEIMIDE COMPOSITES FOR DOWNHOLE TOOL APPLICATIONS

(71) Applicants: Anton Kovalchuk, Houston, TX (US); Anil Sadana, Houston, TX (US)

(72) Inventors: Anton Kovalchuk, Houston, TX (US); Anil Sadana, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 97 days.

(21) Appl. No.: 16/376,357

(22) Filed: Apr. 5, 2019

(65) Prior Publication Data

US 2020/0318456 A1 Oct. 8, 2020

(51) Int. Cl.

| | | |
|---|---|---|
| *E21B 33/12* | (2006.01) | |
| *E21B 33/129* | (2006.01) | |
| *E21B 33/16* | (2006.01) | |
| *C08G 73/12* | (2006.01) | |
| *C08K 5/1515* | (2006.01) | |
| *C08K 3/22* | (2006.01) | |
| *C08K 5/11* | (2006.01) | |
| *C08K 5/1539* | (2006.01) | |
| *C08K 5/42* | (2006.01) | |
| *C08K 5/524* | (2006.01) | |
| *C08K 3/34* | (2006.01) | |

(52) U.S. Cl.
CPC ........ *E21B 33/1294* (2013.01); *C08G 73/128* (2013.01); *C08K 3/22* (2013.01); *C08K 3/34* (2013.01); *C08K 5/11* (2013.01); *C08K 5/1515* (2013.01); *C08K 5/1539* (2013.01); *C08K 5/42* (2013.01); *C08K 5/524* (2013.01); *E21B 33/1208* (2013.01); *E21B 33/16* (2013.01); *C08G 2230/00* (2013.01); *C08K 2003/2206* (2013.01)

(58) Field of Classification Search
None
See application file for complete search history.

(56) References Cited

U.S. PATENT DOCUMENTS

| | | |
|---|---|---|
| 2,661,064 A | 12/1953 | Rockoff |
| 6,245,841 B1 | 6/2001 | Yeager et al. |
| 7,427,654 B1 | 9/2008 | Cheng et al. |
| 9,303,200 B2 | 4/2016 | Korte et al. |
| 2006/0131031 A1 | 6/2006 | McKeachnie et al. |
| 2008/0261014 A1 | 10/2008 | McGuire et al. |
| 2009/0200013 A1 | 8/2009 | Craster et al. |
| 2009/0236091 A1 | 9/2009 | Hammami et al. |
| 2009/0277625 A1* | 11/2009 | Bai ................. F16L 58/1027 166/65.1 |
| 2010/0326660 A1* | 12/2010 | Ballard ............. C08G 59/5006 166/300 |
| 2011/0308802 A1 | 12/2011 | Ladva et al. |
| 2014/0102726 A1 | 4/2014 | Gamstedt et al. |
| 2014/0262212 A1* | 9/2014 | Sherlin ................. E21B 33/134 166/192 |
| 2014/0295723 A1* | 10/2014 | Nelson .................... C08K 7/10 442/59 |
| 2015/0337619 A1 | 11/2015 | Hern et al. |
| 2016/0001532 A1 | 1/2016 | Maziers |
| 2016/0145486 A1 | 5/2016 | Weaver et al. |
| 2016/0281454 A1* | 9/2016 | Zhu ....................... E21B 33/12 |
| 2018/0131124 A1* | 5/2018 | Matlack ............... F04D 29/086 |
| 2019/0092998 A1 | 3/2019 | Kovalchuk et al. |

FOREIGN PATENT DOCUMENTS

EP 0396383 A2 11/1990

OTHER PUBLICATIONS

International Search Report for International Application No. PCT/US2020/019874, International Filing Date Feb. 26, 2020, dated Jun. 15, 2020, 3 pages.
Written Opinion for International Application No. PCT/US2020/019874, International Filing Date Feb. 26, 2020, dated Jun. 15, 2020, 5 pages.
Colquhoun et al. "Mechanical behaviour of degradable phosphate glass fibres and composites—a review", Biomed. Mater. 11 (2016) 18 pages.

* cited by examiner

*Primary Examiner* — Andrew Sue-Ako
(74) *Attorney, Agent, or Firm* — Cantor Colburn LLP

(57) ABSTRACT

A method for operating in a borehole comprises disposing in a downhole environment an article comprising a bismaleimide composite which comprises a polybismaleimide and a disintegrating agent; exposing the article to an aqueous fluid at a temperature of about 25° C. to about 300° C.; and disintegrating the article.

19 Claims, No Drawings

DISINTEGRATABLE BISMALEIMIDE COMPOSITES FOR DOWNHOLE TOOL APPLICATIONS

BACKGROUND

Downhole constructions including oil and natural gas wells, $CO_2$ sequestration boreholes, etc. often utilize borehole components or tools that, due to their function, are only required to have limited service lives that are considerably less than the service life of the well. After a component or tool service function is complete, it must be removed or disposed of in order to recover the original size of the fluid pathway for uses such as hydrocarbon production and $CO_2$ sequestration. Disposal of components or tools can be accomplished by milling or drilling the component or by tripping the tool out of the borehole. Each of these is generally time consuming and expensive. Intervention-less parts or tools that can disintegrate or dissolve in the downhole environment after performing their function and thus do not require milling, drilling or other removal operations, are getting wider use and higher demand in the industry. Different degradable materials are sought to fulfill wide range of application requirements (mechanical strength, downhole temperature, pressure, salinity, degradation rate, etc).

BRIEF DESCRIPTION

A method for operating in a borehole comprises disposing in a downhole environment an article comprising a bismaleimide composite which comprises a polybismaleimide and a disintegrating agent; exposing the article to an aqueous fluid at a temperature of about 25° C. to about 300° C.; and disintegrating the article.

DETAILED DESCRIPTION

Polybismaleimides (BMIs) are high performance thermoset polymers. They are known for their high mechanical strength and long-term heat and oxidative stability. However, BMIs are susceptible to hydrolysis breakdown at elevated temperatures. The inventors have found that articles containing certain bismaleimide composites, after being deployed downhole in contact with water-based fluids at elevated temperatures, are able to degrade their mechanical strength and eventually break up and be removed without using any mechanical means.

The bismaleimide composites may include polybismaleimide and a disintegrating agent. The polybismaleimide can be derived from 4,4'-bismaleimidodiphenylmethane and a diamine via Michael addition reaction. The monomer 4,4'-bismaleimidodiphenylmethane can also be copolymerized with a co-monomer such as 2,2'-diallyl bisphenol A.

The disintegrating agents for the bismaleimide composites include an acid, an acid precursor, a base, a degradable epoxy compound, or a combination comprising at least one of the foregoing. The acid precursors include ally and vinyl compounds such as diallyl maleate, diallyl phthalate, diallyl isophthtalate, divinyl sulfone, and divinyl adipate; organic acid esters such as methyl benzenesulfonate, methyl-p-toluene sulfonate, and diethyl chlorophosphate; or organic acid anhydrides such as maleic anhydride, and phthalic anhydride. The organic acids include oxalic acid, citric acid, amidosulfonic acid, or a combination comprising at least one of the foregoing. Examples of the bases include sodium hydroxide, potassium hydroxide, calcium hydroxide, sodium metasilicate, and the alike. Degradable epoxy compounds include epoxidized natural oils, glycerol diglycidyl ether, polypropylene glycol diglycidyl ether, diglycidyl 1,2-cyclohexane dicarboxylate, or a combination comprising at least one of the foregoing.

The amounts of the polybismaleimide and the disintegrating agent can be adjusted to balance the disintegration rate and the desirable physical properties. In an embodiment, the weight ratio of the polybismaleimide relative to the disintegrating agent in the composites is about 95:5 to about 90:10, about 85:15 to about 80:20, or about 80:20 to about 70:30.

An additive composition can be used, comprising one or more additives selected to achieve desired properties, with the proviso that the additive(s) are also selected so as to not significantly adversely affect a desired property of the bismaleimide composites. The additive composition or individual additives can be mixed at a suitable time during the mixing of the components for forming the bismaleimide composites. Exemplary additives include reinforcement tillers such as glass fibers, carbon fibers, polymer fibers, metal fibers, metal powders, metal wools, nanomaterials, or a combination comprising at least one of the foregoing. The nanomaterial include nanoclays, carbon nanotubes, thermally expanded graphite, graphene, graphene oxide, or fullerenes. The fibers may be present in the form of short fibers, continuous fibers, woven fabrics, nonwoven fabrics, or a combination comprising at least one of the foregoing. The reinforcement fillers can be present in an amount of about 0.1 wt % to about 60 wt %, about 1 wt % to about 10 wt %, or about 20 wt % to about 40 wt %, each based on the total weight of the bismaleimide composites.

The composite can optionally further contain a cyanate ester, an epoxy resin, or a combination thereof. The weight ratio of the polybismaleimide relative to the cyanate ester, the epoxy resin, or a combination thereof can be about 90:10 to about 70:30 or about 60:40 to about 30:70.

The bismaleimide composites are manufactured by compressing a composition comprising the polybismaleimide, the disintegrating agent, and the optional additives as disclosed herein at a temperature of about 20° C. to about 250° C. and a pressure of about 15 psi to about 30,000 psi, about 500 psi to about 30,000 psi, or about 1,000 psi to about 5000 psi.

The obtained polymer composites can be further machined or shaped to form an article of desired shape. Machining includes cutting, sawing, ablating, milling, facing, lathing, boring, and the like using, for example, a miller, saw, lathe, router, electric discharge machine, and the like. Alternatively, the polymer composites can be directly molded to the useful shape by choosing the molds having the desired shape.

The article can be a downhole tool. In an embodiment, the downhole tool is a single component. In another embodiment the downhole tool inhibits flow. In yet another embodiment, the downhole tool is pumpable within a downhole environment.

Examples of the downhole tools include flappers, hold down dogs and springs, screen protectors, seal bore protectors, electric submersible pump space out subs, full bore guns, chemical encapsulations, slips, dogs, springs and collet restraints, liner setting sleeves, timing actuation devices, emergency grapple release, chemical encapsulation containers, screen protectors, beaded screen protectors, whipstock lugs, whipstock coatings, pins, set screws, emergency release tools, gas generators, mandrels, release mechanisms, staging collars, C-rings, components of perforating gun systems, disintegrable whipstock for casing exit tools, shear pins, dissolvable body locking rings, mud motor stators, progressive cavity pump stators, or shear screws.

Pumpable downhole tools include plugs, direct connect plugs, bridge plugs, wiper plugs, frac plugs, components of frac plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, or darts.

The downhole tools that inhibit flow include seals, high pressure beaded frac screen plugs, screen basepipe plugs, coatings for balls and seats, compression packing elements, expandable packing elements, O-rings, bonded seals, bullet seals, sub-surface safety valve seals, sub-surface safety valve flapper seal, dynamic seals, V-rings, back up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, or sleeves.

Methods to disintegrate the article comprising the bismaleimide composites comprise disposing the article in a downhole environment, exposing the article to an aqueous fluid at a temperature of about 25° C. to about 300° C., about 65° C. to about 250° C., or about 65° C. to about 150° C. or about 175° C. to about 250° C., and disintegrating the article. The pressure can be about 100 psi to about 15,000 psi.

The aqueous fluid includes water, brine, an alkaline fluid, or an acidic fluid. The brine can include NaCl, KCl, NaBr, $MgCl_2$, $CaCl_2$, $CaBr_2$, $ZnBr_2$, $NH_4Cl$, sodium formate, cesium formate, and the like. The alkaline solution can include an alkaline salt of one or more of the following: Na; K; Ca; Mg; Li; or Ce. The salts present in the brine or the alkaline solution can be in an amount of from about 0.5 weight percent (wt. %) to about 50 wt. %, specifically about 1 wt. % to about 40 wt. %, and more specifically about 1 wt. % to about 25 wt. %, based on the weight of the brine, the acid, or the alkaline fluid.

In an embodiment, a downhole operation is performed before the article is disintegrated and removed. The downhole operation can be a drilling operation, a fracturing operation, or a stimulation operation.

Degradation of a bismaleimide composite reinforced with short glass fibers has been tested initially at 265° F. in high pH water-based brine (sodium chloride 6 wt % in water, with sodium hydroxide added) at pH 12. Significant softening and deterioration of the material were seen after 20 hours of exposure.

Set forth are various embodiments of the disclosure.

Embodiment 1

A method for operating in a borehole, the method comprising: disposing in a downhole environment an article comprising a bismaleimide composite which comprises a polybismaleimide and a disintegrating agent; exposing the article to an aqueous fluid at a temperature of about 25° C. to about 300° C.; and disintegrating the article.

Embodiment 2

The method as in any prior embodiment, wherein the disintegrating agent comprises an acid, an acid precursor, a base, a degradable epoxy compound, or a combination comprising at least one of the foregoing.

Embodiment 3

The method as in any prior embodiment, wherein the disintegrating agent comprises the acid precursor, which includes an ester, an anhydride, or a combination comprising at least one of the foregoing.

Embodiment 4

The method as in any prior embodiment, wherein the disintegrating agent comprises diallyl maleate, diallyl phthalate, diallyl isophthtalate, divinyl sulfone, divinyl adipate, methyl benzenesulfonate, methyl-p-toluene sulfonate, diethyl chlorophosphate, maleic anhydride, phthalic anhydride, or a combination comprising at least one of the foregoing.

Embodiment 5

The method as in any prior embodiment, wherein the disintegrating agent comprises the base, which includes sodium hydroxide, potassium hydroxide, calcium hydroxide, sodium metasilicate, or a combination comprising at least one of the foregoing.

Embodiment 6

The method as in any prior embodiment, wherein the disintegrating agent comprises the degradable epoxy compound, which includes epoxidized natural oils, glycerol diglycidyl ether, polypropylene glycol diglycidyl ether, diglycidyl 1,2-cyclohexane dicarboxylate, or a combination comprising at least one of the foregoing.

Embodiment 7

The method as in any prior embodiment, wherein the polybismaleimide is derived from 4,4'-bismaleimidodiphenylmethane and a diamine.

Embodiment 8

The method as in any prior embodiment, wherein the weight ratio of the polybismaleimide relative to the disintegrating agent is about 95:5 to about 70:30.

Embodiment 9

The method as in any prior embodiment, wherein the bismaleimide composite further comprises a reinforcement filler, which comprises glass fiber, carbon fiber, a polymer fiber, a metal fiber, a metal powder, a metal wool, a nanomaterial, or a combination comprising at least one of the foregoing.

Embodiment 10

The method as in any prior embodiment, wherein the reinforcement filler is present in an amount of about 0.1 wt % to about 60 wt % based on the total weight of the bismaleimide composite.

Embodiment 11

The method as in any prior embodiment, wherein the bismaleimide composite further comprises a cyanate ester, an epoxy resin, or a combination comprising at least one of the foregoing.

Embodiment 12

The method as in any prior embodiment, wherein the weight ratio of the polybismaleimide relative to the cyanate ester, the epoxy resin, or a combination thereof is about 90:10 to about 30:70.

Embodiment 13

The method as in any prior embodiment, wherein the article is exposed to the aqueous fluid at a pressure of about 100 psi to about 15,000 psi.

Embodiment 14

The method as in any prior embodiment, wherein the aqueous fluid is water, a brine, an alkaline fluid, or an acidic fluid.

Embodiment 15

The method as in any prior embodiment, further comprising performing a downhole operation before disintegrating the article.

Embodiment 16

The method as in any prior embodiment, wherein the article is a pumpable downhole tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

Embodiment 17

The method as in any prior embodiment, wherein the article is downhole tool that inhibits flow and comprises a seal, a high pressure beaded frac screen plug, a screen basepipe plug, a coating for a balls and a seat, a compression packing element, an expandable packing element, an O-ring, a bonded seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method for operating in a borehole, the method comprising:
    disposing in a downhole environment an article comprising a bismaleimide composite which comprises a polybismaleimide and a disintegrating agent;
    exposing the article to an aqueous fluid at a temperature of about 25° C. to about 300° C.; and
    disintegrating the article,
    wherein the bismaleimide composite further comprises a cyanate ester, an epoxy resin, or a combination comprising at least one of the foregoing; and
    the weight ratio of the polybismaleimide relative to the cyanate ester, the epoxy resin, or a combination thereof is about 90:10 to about 30:70.

2. The method of claim 1, wherein the disintegrating agent comprises an acid, an acid precursor, a base, a degradable epoxy compound, or a combination comprising at least one of the foregoing.

3. The method of claim 2, wherein the disintegrating agent comprises the acid precursor, which includes an ester, an anhydride, or a combination comprising at least one of the foregoing.

4. The method of claim 2, wherein the disintegrating agent comprises the base, which includes sodium hydroxide, potassium hydroxide, calcium hydroxide, sodium metasilicate, or a combination comprising at least one of the foregoing.

5. The method of claim 1, wherein the polybismaleimide is derived from 4,4'-bismaleimidodiphenylmethane and a diamine.

6. The method of claim 1, wherein the weight ratio of the polybismaleimide relative to the disintegrating agent is about 95:5 to about 70:30.

7. The method of claim 1, wherein the bismaleimide composite further comprises a reinforcement filler, which comprises glass fiber, carbon fiber, a polymer fiber, a metal fiber, a metal powder, a metal wool, a nanomaterial, or a combination comprising at least one of the foregoing.

8. The method of claim 7, wherein the reinforcement filler is present in an amount of about 0.1 wt % to about 60 wt % based on the total weight of the bismaleimide composite.

9. The method of claim 1, wherein the article is exposed to the aqueous fluid at a pressure of about 100 psi to about 15,000 psi.

10. The method of claim 9, wherein the aqueous fluid is water, a brine, an alkaline fluid, or an acidic fluid.

11. The method of claim 1, further comprising performing a downhole operation before disintegrating the article.

12. The method of claim 1, wherein the article is a pumpable downhole tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

13. The method of claim 1, wherein the article is downhole tool that inhibits flow and comprises a seal, a high pressure beaded frac screen plug, a screen basepipe plug, a coating for a balls and a seat, a compression packing element, an expandable packing element, an O-ring, a bonded seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

14. The method of claim 1, wherein the disintegrating agent comprises diallyl maleate, diallyl phthalate, diallyl isophthtalate, divinyl sulfone, divinyl adipate, methyl benzenesulfonate, methyl-p-toluene sulfonate, diethyl chlorophosphate, maleic anhydride, phthalic anhydride, or a combination comprising at least one of the foregoing.

15. The method of claim 1, wherein the disintegrating agent comprises the degradable epoxy compound, which includes epoxidized natural oils, glycerol diglycidyl ether, polypropylene glycol diglycidyl ether, diglycidyl 1,2-cyclohexane dicarboxylate, or a combination comprising at least one of the foregoing.

16. A method for operating in a borehole, the method comprising:
   disposing in a downhole environment an article comprising a bismaleimide composite which comprises a polybismaleimide and a disintegrating agent;
   exposing the article to an aqueous fluid at a temperature of about 25° C. to about 300° C.; and
   disintegrating the article,
   wherein the disintegrating agent comprises diallyl maleate, diallyl phthalate, diallyl isophthalate, divinyl sulfone, divinyl adipate, methyl benzenesulfonate, methyl-p-toluene sulfonate, diethyl chlorophosphate, phthalic anhydride, or a combination comprising at least one of the foregoing; and
   the weight ratio of the polybismaleimide relative to the disintegrating agent is about 95:5 to about 70:30.

17. The method of claim 16, wherein the bismaleimide composite further comprises a cyanate ester, an epoxy resin, or a combination comprising at least one of the foregoing.

18. The method of claim 17, wherein the weight ratio of the polybismaleimide relative to the cyanate ester, the epoxy resin, or a combination thereof is about 90:10 to about 30:70.

19. A method for operating in a borehole, the method comprising:
   disposing in a downhole environment an article comprising a bismaleimide composite which comprises a polybismaleimide and a disintegrating agent;
   exposing the article to an aqueous fluid at a temperature of about 25° C. to about 300° C.; and
   disintegrating the article,
   wherein the disintegrating agent comprises the degradable epoxy compound, which includes glycerol diglycidyl ether, diglycidyl 1,2-cyclohexane dicarboxylate, or a combination comprising at least one of the foregoing,
   the weight ratio of the polybismaleimide relative to the disintegrating agent is about 95:5 to about 70:30.

* * * * *